(12) United States Patent
Mitby

(10) Patent No.: US 8,149,999 B1
(45) Date of Patent: Apr. 3, 2012

(54) GENERATING REFERENCE VARIATIONS

(75) Inventor: David John Mitby, Mountain View, CA (US)

(73) Assignee: TellMe Networks, Inc., Mountain View, CA (US)

( * ) Notice: Subject to any disclaimer, the term of this patent is extended or adjusted under 35 U.S.C. 154(b) by 1454 days.

(21) Appl. No.: 11/615,063

(22) Filed: Dec. 22, 2006

(51) Int. Cl.
  *H04M 1/64* (2006.01)
(52) U.S. Cl. .................. 379/88.01; 455/563; 704/246; 704/251
(58) Field of Classification Search ......... 379/218.01, 379/218.02, 88.01–88.03; 455/563; 704/246–256
  See application file for complete search history.

(56) References Cited

U.S. PATENT DOCUMENTS

| | | | | |
|---|---|---|---|---|
| 5,995,918 A * | 11/1999 | Kendall et al. | .................. | 704/1 |
| 6,119,085 A * | 9/2000 | Lewis et al. | .................. | 704/260 |
| 6,404,876 B1 * | 6/2002 | Smith et al. | .............. | 379/218.01 |
| 6,658,455 B1 * | 12/2003 | Weinman, Jr. | ................ | 709/203 |
| 6,714,631 B1 * | 3/2004 | Martin et al. | ............. | 379/88.02 |
| 6,754,625 B2 * | 6/2004 | Olsen et al. | .................. | 704/235 |
| 6,870,915 B2 * | 3/2005 | Stillman et al. | .......... | 379/201.01 |
| 6,999,930 B1 * | 2/2006 | Roberts et al. | ............. | 704/270.1 |
| 7,103,542 B2 * | 9/2006 | Doyle | .......................... | 704/231 |
| 7,623,648 B1 * | 11/2009 | Oppenheim et al. | ...... | 379/218.01 |
| 7,676,367 B2 * | 3/2010 | Roth et al. | .................... | 704/252 |

* cited by examiner

*Primary Examiner* — Simon Sing
(74) *Attorney, Agent, or Firm* — Perkins Coie LLP

(57) ABSTRACT

A method includes receiving information provided to a caller in response to an utterance from the caller. The utterance may be associated with identifying an item of interest. The method may also include generating a reference variation associated with identifying the item of interest based on the utterance.

20 Claims, 7 Drawing Sheets

GENERATING REFERENCE VARIATIONS

BACKGROUND

1. Field of the Invention

Implementations described herein relate generally to speech recognition and, more particularly, to generating reference variations associated with utterances.

2. Description of Related Art

Conventional directory assistance systems use speech recognition to attempt to automatically determine what was said by a caller and then identify a corresponding telephone number associated with the voice input provided by the caller. Such systems typically suffer from a number of problems.

For example, the caller often requests the telephone number for a business or person for which no corresponding entry exists in the directory assistance system. In such a situation, a human operator intervenes to attempt to locate the desired listing and corresponding telephone number. The use of a human operator increases the costs for such directory assistance systems and significantly slows down the processing speed associated with providing information to the caller.

SUMMARY

According to one aspect, a method may include receiving information provided to a caller in response to an utterance from the caller. The method may also include at least one of generating or modifying a grammar associated with performing speech recognition based on the utterance.

According to another aspect, a system may include at least one logic device configured to receive a telephone number provided to a caller by an operator in response to voice input from the caller and identify a listing associated with the telephone number. The at least one logic device may also be configured to generate a variation associated with at least a portion of the listing based on the voice input, where the variation includes an alternative way to identify at least the portion of the listing.

According to yet another aspect, a method may include receiving information provided to a caller in response to an utterance from the caller, the utterance being associated with identifying an item of interest. The method may also include generating a reference variation associated with identifying the item of interest based on the utterance.

According to still another aspect, a speech recognition system may include logic configured to receive information provided by a human operator to a caller in response to an utterance from a caller and identify an item of interest associated with the information provided by the operator. The logic may also be configured to generate a variation of at least one word associated with the item of interest based on the utterance.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Exemplary System

Figure 1:
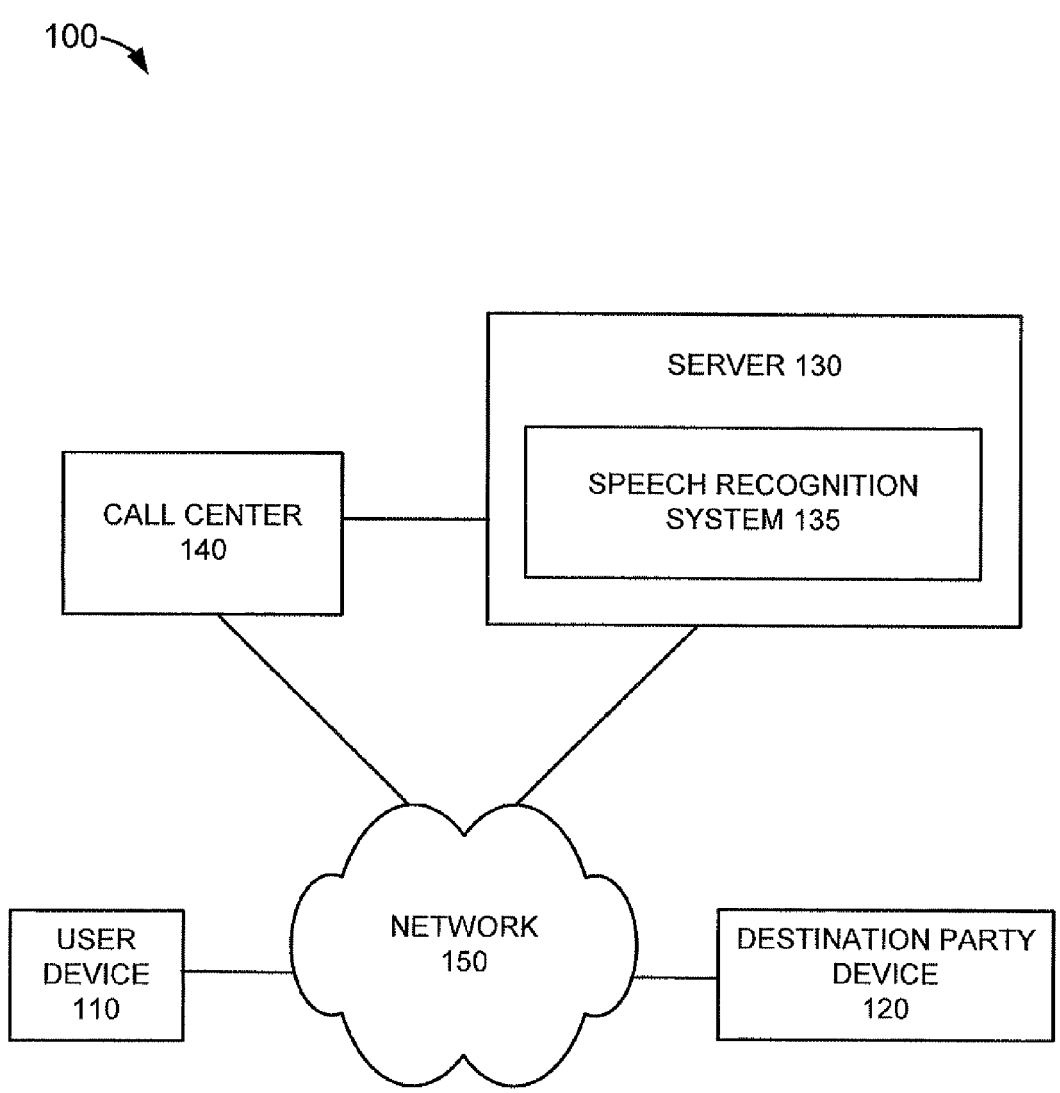
FIG. 1 is a block diagram of an exemplary network in which systems and methods described herein may be implemented.

FIG. 1 is a block diagram of an exemplary network 100 in which systems and methods described herein may be implemented. Network 100 may include user device 110, destination party device 120, server 130, speech recognition system 135 and call center 140 connected via network 150. User device 110, destination party device 120, server 130, speech recognition system 135 and call center 140 may connect to network 150 via wired, wireless, or optical connections. The exemplary configuration illustrated in FIG. 1 is provided for simplicity. It should be understood that a typical system may include more or fewer elements than illustrated in FIG. 1. For example, gateways, routers, switches, etc., involved in routing a call between caller and called devices may be included in network 100. Also, in some instances, the functions described below as being performed by one device may be combined with the functions performed by another device. For example, server 130 may also perform the functions of call center 140 in some implementations.

User device 110 and destination party device 120 may each include any type of communication or computation device that is capable of transmitting and receiving voice signals and/or data to/from a network, such as network 150. For example, user device 110 and/or destination party device 120 may include any standard telephone, cordless telephone, cellular telephone, or other type of conventional telephone that interfaces with a public switched telephone network (PSTN) and/or wireless network to place and receive telephone calls. User device 110 and/or destination party device 120 may also include any client, such as a computer device, a web-based appliance, etc., that is configured to provide telephone functions using, for example, voice over Internet protocol (VoIP). For example, user device 110 and/or destination party device 120 may include a session initiation protocol (SIP)-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional personal computer (PC), laptop computer or other computing device.

Server 130 may include one or more server devices/platforms that provide information to callers, such as a caller at user device 110, and/or provide connections from one party to another party, such as connections from user device 110 to destination party device 120. In an exemplary implementation, server 130 may include speech recognition system 135 that receives voiced requests for information, such as requests for telephone numbers, from callers and determines what the callers voiced. Speech recognition system 135 may then provide the desired information to the callers and/or connect the caller (e.g., a caller at user device 110) to the desired party (e.g., a party at destination party device 120), as described in detail below.

Call center 140 may include one or more call centers to assist callers, such as a caller at user device 110, in finding information. Call center 140 may include a number of workstations associated with human operators that assist callers in obtaining the desired information, such as a telephone number, and may provide the information to the caller via network 150. Caller center 140 may also connect to server 130 via network 150 or via another connection.

Network 150 may include one or more wired and/or wireless networks that are capable of receiving and transmitting data and voice signals. For example, network 150 may include one or more public switched telephone networks (PSTNs) or other type of switched network. Network 150 may also include one or more wireless networks and may include a number of transmission towers for receiving wireless signals and forwarding the wireless signals toward the intended destination. Network 150 may further include one or more packet switched networks, such as an Internet protocol (IP) based network, a local area network (LAN), a wide area network (WAN), an intranet, the Internet, or another type of network that is capable of transmitting telecommunications traffic (e.g., VoIP traffic). For example, network 150 may include one or more SIP-based networks, one or more H.323/H.225-based networks, or any other type of packet switched network that is capable of transmitting traffic from a source device to a destination device.

Figure 2:
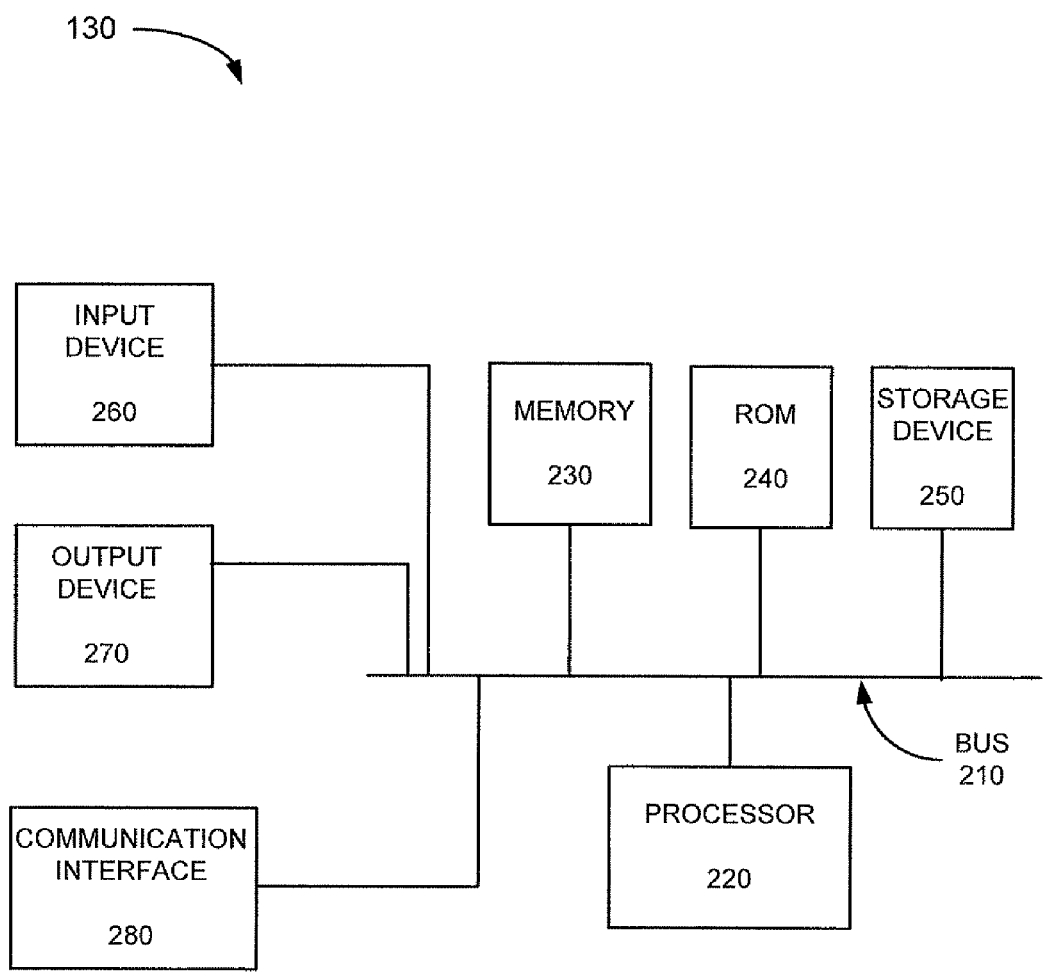
FIG. 2 is a block diagram illustrating an exemplary configuration of the server of FIG. 1.

FIG. 2 is an exemplary diagram of server 130. Server 130 may include bus 210, processor 220, main memory 230, read only memory (ROM) 240, storage device 250, input device 260, output device 270, and communication interface 280. Bus 210 may include one or more conductors that permit communication among the components of server 130.

Processor 220 may include any type of processor, microprocessor or processing logic that interprets and executes instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Input device 260 may include one or more conventional mechanisms that permit a user to input information to server 130, such as a keyboard, a mouse, a pen, voice recognition and/or biometric mechanisms, etc. Output device 270 may include one or more conventional mechanisms that output information to the user, such as a display, a printer, a speaker, etc. Communication interface 280 may include any transceiver-like mechanism that enables server 130 to communicate with other devices and/or systems. For example, communication interface 280 may include mechanisms for communicating with another device or system via a network, such as network 150.

In an exemplary implementation, server 130 may include speech recognition system 135 that performs speech recognition based on voice inputs received from user device 110 and provides output to user device 110. Server 130 may also generate reference variations associated with voice input provided by a user to attempt to identify what the user has voiced. Server 130 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
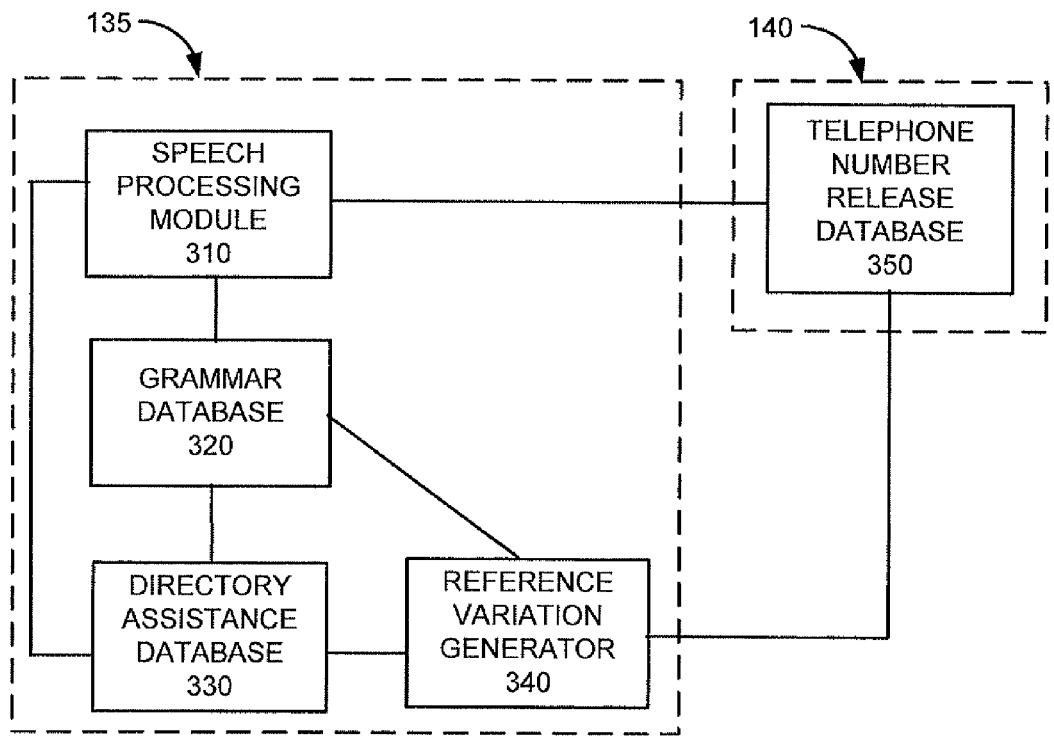
FIG. 3 is a functional block diagram illustrating an exemplary configuration of the speech recognition system of FIG. 1.

FIG. 3 is a functional block diagram illustrating an exemplary configuration of speech recognition system 135. As discussed above, speech recognition system 135 may be executed by server 130. In alternative implementations, speech recognition system 135 may be a separate component of network 100. Speech recognition system 135 may include speech processing module 310, grammar database 320, directory assistance (DA) database 330 and reference variation generator 340. The blocks illustrated in FIG. 3 may be implemented in software, hardware, or a combination of hardware and software. In addition, each of the functional blocks may represent one or more computer processors, threads, and/or objects that aid in speech recognition. Other configurations may alternatively be used. In addition, while FIG. 3 illustrates these components as being separate elements, it should be understood that in other implementations, one or more of the components illustrated in FIG. 3 may be combined with other components.

Speech processing module 310 may receive voice inputs from callers, such as a caller at user device 110. Speech processing module 310 may perform speech recognition for received voice inputs in accordance with rules or grammars stored in grammar database 320.

Grammar database 320 may store a number of grammars or rules associated with performing speech recognition. For example, a grammar may define one or more rules with respect to performing speech recognition. In an exemplary implementation, the grammars stored in grammar database 320 may be customized based on information included in DA database 330 and information generated by reference variation generator 340, as described in detail below.

DA database 330 may include information associated with directory assistance listings, such as telephone number listings for business entities. This information may be used to generate grammars stored in grammar database 320 to enable speech processing module 310 to automatically assist callers without human intervention, as described in more detail below.

Figure 4:
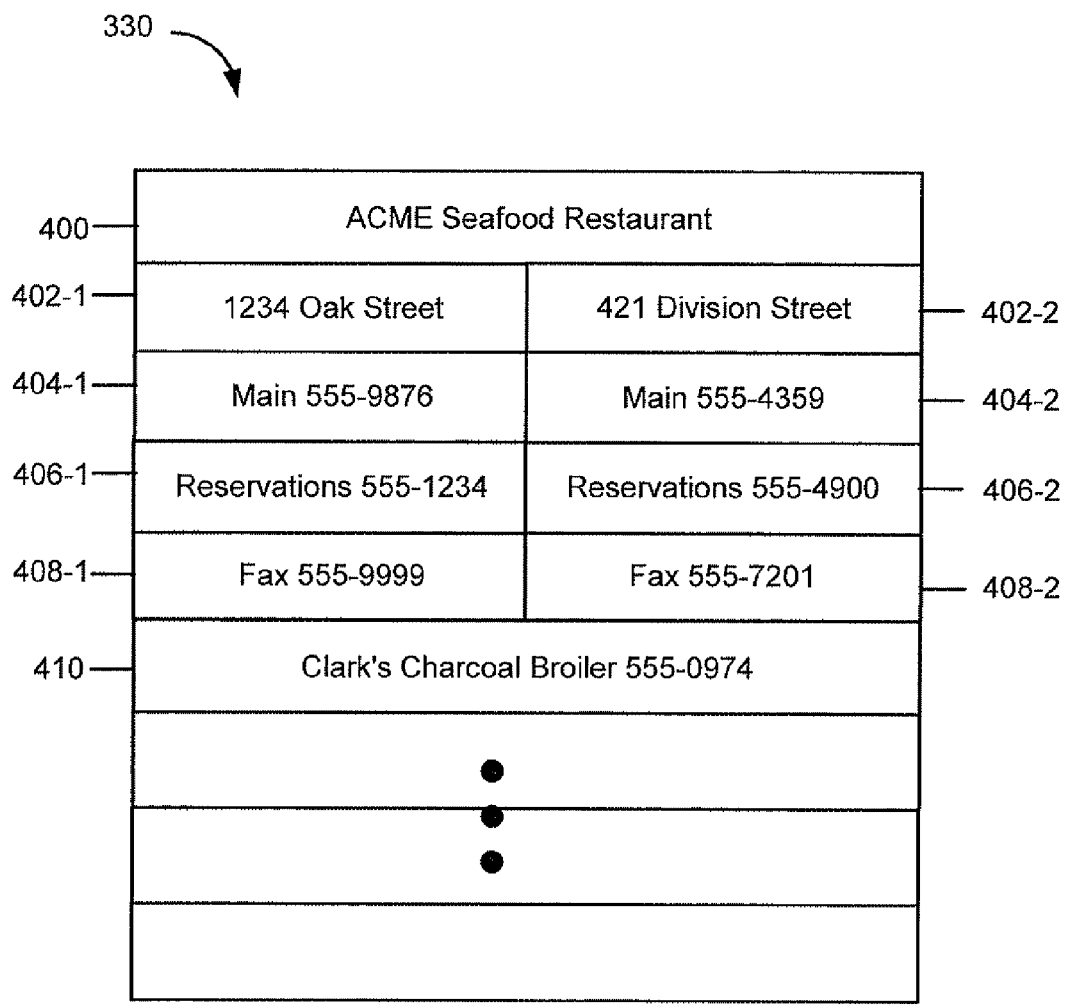
FIG. 4 is a diagram illustrating a portion of the directory assistance database of FIG. 3 in an exemplary implementation.

DA database 330 may include information/listings that may appear in, for example, a telephone book. In this implementation, the information may include "straight line" listings in which the name of the business and a corresponding telephone number are stored. In other instances, a listing may be a "caption type listing" which includes a number of locations and/or departments for a single business entity. For example, assume that "ACME Seafood Restaurant" is a chain of restaurants. In this case, a listing for ACME Seafood Restaurant in DA database 330 may include one or more sub-listings associated with each location. For example, referring to FIG. 4, DA database 330 may include an entry 400 storing ACME Seafood Restaurant with sub-listings 402-1 and 402-2 listing addresses for two ACME Seafood Restaurants. DA database 330 may further include main telephone numbers for each restaurant in fields 404-1 and 404-2, respectively. DA database 330 may further include reservation telephone numbers in fields 406-1 and 406-2 and facsimile numbers in fields 408-1 and 408-2, respectively, for each of the two locations.

DA database 330 may also include straight line type listings, such as listing 410 which includes the name of the business (i.e., Clark's Charcoal Broiler) and a corresponding telephone number. DA database 330 may include additional information for a number of other businesses in a similar manner.

Reference variation generator 340 may generate variations of the listing information stored in DA database 330 to aid in the creation and/or modifying of grammars stored in grammar database 320. The term "reference variation" as used herein includes any variation, modification or alteration of a word or phrase stored in, for example, DA database 330 that a caller may use when attempting to identify an entity (e.g., a business entity) stored in DA database 330. Such reference variations may include abbreviated versions of one or more words/phrases in DA database 330 and/or totally different words or phrases from words/phrases stored in DA database 330 that a caller may use when attempting to identify an entity for which a listing may be stored in DA database 330. For example, reference variations for the listing for "Bill's Motor Lodge" may include "Bill's Lodge," "Bill's Hotel," "Bill's Motel," "Bill's Inn," "Bill's Motor Inn," etc. That is, a caller wishing to get a telephone number for Bill's Motor Lodge might voice "Bill's Motel," "Bill's Motor Inn," etc. In this example, reference variation generator 340 may identify common words and/or phrases that may be substituted for or added to terms in an actual listing for a business.

Reference variation generator 340 may also determine that certain fields in a listing are frequently not used by callers in attempting to identify a listing. As an example, a caller may voice "ACME Seafood" or "ACME Restaurant" when attempting to get a listing for ACME Seafood Restaurant. In this case, reference variation generator 340 may determine that the word "seafood" and/or "restaurant" are optional.

Reference variation generator 340 may also identify reference variations using other sources of information. For example, reference variation generator 340 may access a dictionary or thesaurus to generate synonyms for common words, such as "seafood" in a listing. In this example, reference variation generator 340 may identify "fish" as being a synonym for seafood.

Reference variation generator 340 may also access the Internet and/or a web search tool to identify reference variations for information stored in DA database 330. For example, reference variation generator 340 may use a search tool to find web pages that may be relevant to a particular word or phrase in a business listing. Reference variation generator 340 may then parse those web pages to identify words/phrases that may be associated with a listing, as described in more detail below. Reference variation generator 340 may use the gathered information to modify existing grammars stored in grammar database 320 and/or generator new grammars for storage in grammar database 320.

Referring back to FIG. 3, reference variation generator 340 may also use information provided by call center 140 to identify potential reference variations. For example, call center 140 may include a telephone number release database 350 identifying telephone numbers released to callers by call center 140. These telephone numbers may correspond to requests from callers for which speech recognition system 135 was unable to automatically resolve the request. That is, the telephone numbers stored in telephone number release database 350 may be telephone numbers for which speech recognition system 135 was unable to find a listing corresponding to the caller's request or was unable to determine what the caller voiced. In either case, reference variation generator 340 may leverage information from telephone number release database 350 to identify potential reference variations for information stored in DA database 330, as described in detail below. This information may then be used to create new grammars and/or modify existing grammars stored in grammar database 320.

In other implementations, database 350 may include other information released by call center 140. For example, database 350 may include a database of business names released by operators at call center 140 or some other identifiers released by operators at call center 140 that may be used to identify an item of interest, such as a listing. In each case, reference variation generator 340 may leverage the information provided by operators at call center 140 to identify potential reference variations.

Figure 5:
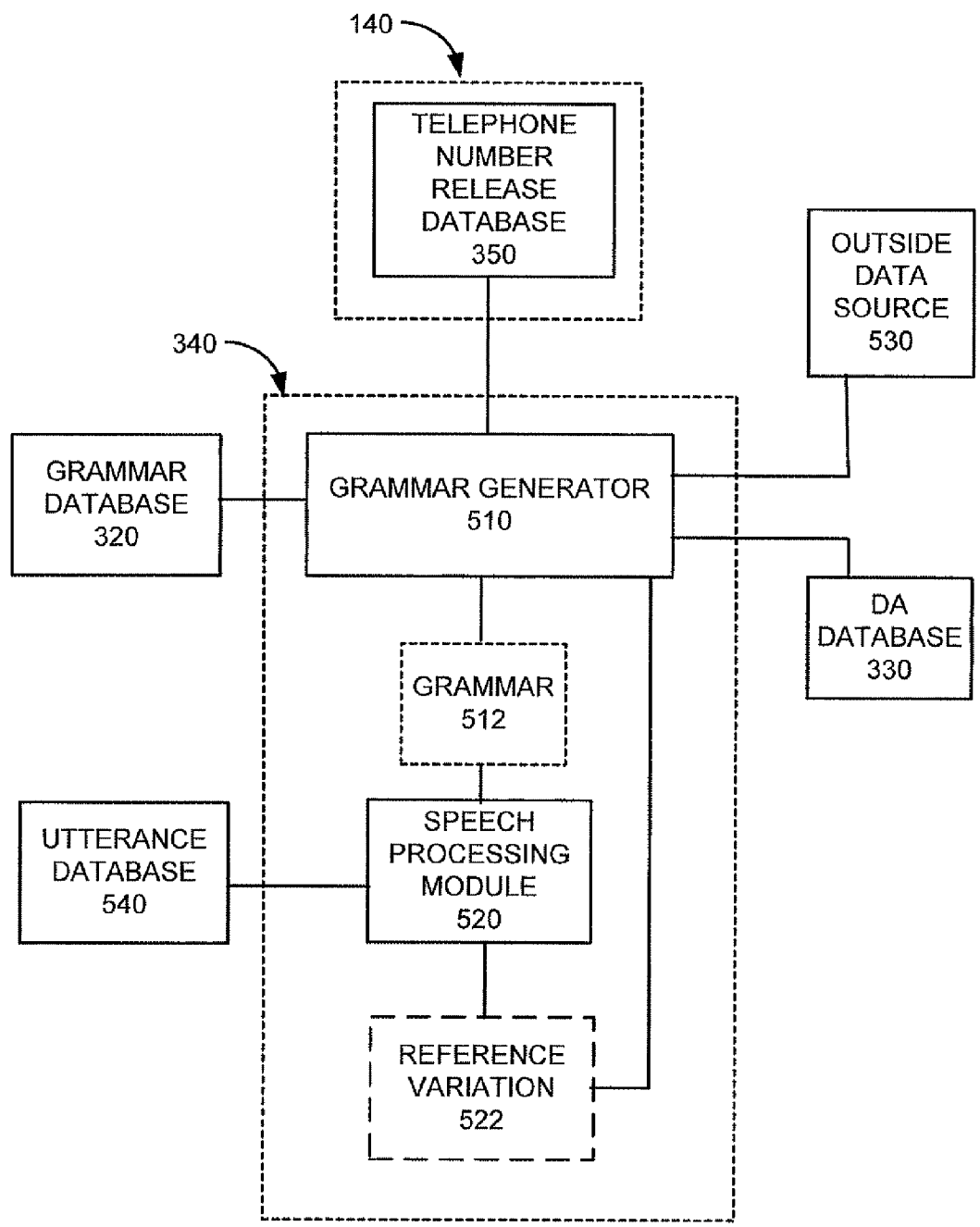
FIG. 5 is a functional block diagram illustrating a portion of the reference variation generator of FIG. 3 in an exemplary implementation.

FIG. 5 is a functional block diagram illustrating a portion of reference variation generator 340 and other elements in network 100 in an exemplary implementation. Referring to FIG. 5, reference variation generator 340 may include grammar generator 510 and speech processing module 520. Grammar generator 510 may generate grammars or rules associated with performing speech recognition associated with information stored in DA database 330. Grammar generator 510 may generate these grammars using information received from telephone number release database 350 and/or outside data source 530. Grammar 512 may represent a temporary grammar associated with a particular listing in DA database 330, as described in detail below.

Speech processing module 520 may include speech recognition software for processing speech input similar to speech processing module 310. In some implementations, speech processing module 310 may be used to perform the functions of speech processing module 520. That is, a single speech processing module (e.g., speech processing module 310) may be used.

Outside data source 530 may represent a number of sources of data, such as a thesaurus, dictionary, a web search tool for searching the Internet, etc. For example, outside data 530 may include a thesaurus. In this case, grammar generator 510 may search the thesaurus for synonyms or other words related to a word/phrase that may be included in DA database 330 and which may be uttered by a caller when attempting to identify a business listing. In the example for ACME Seafood Restaurant, grammar generator 510 may search for synonyms for the word "seafood." In this case, grammar generator 510 may identify "fish" as being synonymous with seafood.

Outside data source 530 may also include a web search tool that is used to search for a word/phrase that may be voiced by a caller. For example, suppose that a business listing exists in DA database 330 for "Joe's Cement Mixing Service." In this case, grammar generator 510 may access the search tool and search for the word "cement" or the term "cement mixing." The search tool may return a number of web pages and grammar generator 510 may then parse one or more of the web pages to identify potentially relevant words/phrases associated with the search query. In this example, one of the pages returned by the search tool may include the term "concrete." In this case, grammar generator 510 may include the term "concrete" as a potential variation for "cement."

Utterance database 540 may include stored audio files corresponding to utterances provided by callers that were forwarded to call center 140. These utterances may correspond to utterances that speech recognition system 135 was unable to automatically process without assistance from call center 140. In this implementation, telephone number release database 350 may include telephone numbers corresponding to the voice utterances in utterance database 540.

For example, utterance database 540 may include an audio file for "ACME Fish House" voiced by a caller intending to find a telephone number of ACME Seafood Restaurant. The audio files in utterance database 540 may also include information keying each of the utterances with a telephone number released by call center 140. For example, the audio file corresponding to the utterance for ACME Fish House stored in utterance database 540 may be keyed or associated with the telephone number 555-9876 released by call center 140 (and stored in telephone number release database 350) for that particular call. Similarly, if the telephone number of Joe's Cement Mixing Service was released by call center 140 in response to a user request for Joe's Concrete, utterance database 540 may include the audio file corresponding to "Joe's Concrete" with the telephone number of Joe's Cement Mixing Service.

Grammar generator 510 may use information from DA database 330, telephone number release database 350 and outside data source 530 to generate grammar 512. Grammar 512 may be based on a particular utterance and may be provided to speech processing module 520. Speech processing module 520 may then generator a reference variation for information stored in DA database 330. The reference variation may then be provided to grammar generator 510 for modifying an existing grammar and/or generating a new grammar in grammar database 320, as described in detail below.

Exemplary Processing

Figure 6:
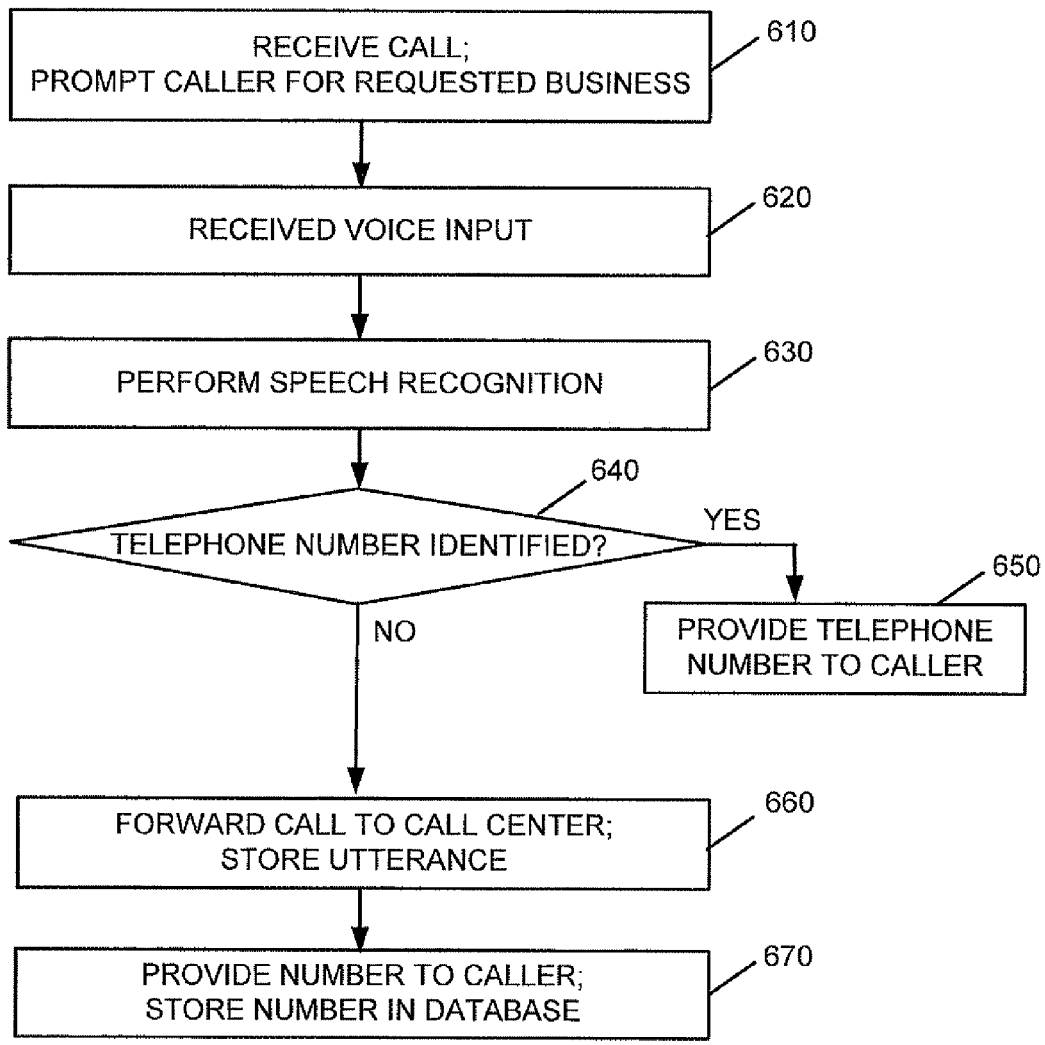
FIGS. 6 and 7 are flow diagrams illustrating processing according to an exemplary implementation.

FIG. 6 illustrates exemplary processing associated with processing calls in network 100. Processing may begin with a caller contacting server 130 for directory assistance (act 610). For example, a caller at user device 110 may dial a telephone number associated with server 130. Server 130 may forward the call to speech recognition system 135. Speech recognition system 135 may then, for example, prompt the user to voice a name of the business for which the caller would like the telephone number (act 610). For example, speech recognition system 135 may include an interactive voice response (IVR) unit that voices a prompt requesting that the caller provide the name of the business for which he/she would like the telephone number. In some instances, the IVR unit of speech recognition system 135 may prompt the caller to first provide a city and/or state associated with the business, followed by a prompt for the business name.

In either case, assume that the caller voices "ACME Fish Market." Speech processing module 310 may receive the utterance provided by the caller (act 620). Speech processing module 310 may then determine what the caller voiced (act 630). For example, speech processing module 310 may use grammar database 320 to attempt to identify what the caller voiced. Speech processing module 310 may then search DA database 330 for an entry corresponding to what the caller voiced to identify a corresponding telephone number (act 640).

In this example, if ACME Fish Market is listed in DA database 330 or if grammar database 320 includes a grammar indicating that "Fish Market" may be used in place of "Seafood Restaurant," speech processing module 310 may release the telephone number for ACME Seafood Restaurant to the caller (act 650). If speech processing module 310 is unable to identify a listing for ACME Fish Market, speech processing module 310 may forward the call to call center 140 (act 660). Speech processing module 310 may also store the voice input provided by the caller in utterance database 540 (act 660). In some instances, the stored voice input may also be forwarded to call center 140.

An operator at call center 140 may interact with the caller and determine that the caller wishes to receive the telephone number for ACME Seafood Restaurant. In this case, call center 140 may release the telephone number to the caller and may also store the telephone number in telephone number release database 350 (act 670).

Reference variation generator 340, as described above, may use or leverage the information stored in telephone number release database 350 to generate additional reference variations for utterances that may then be used to create and/or adjust grammars in grammar database 320.

Figure 7:
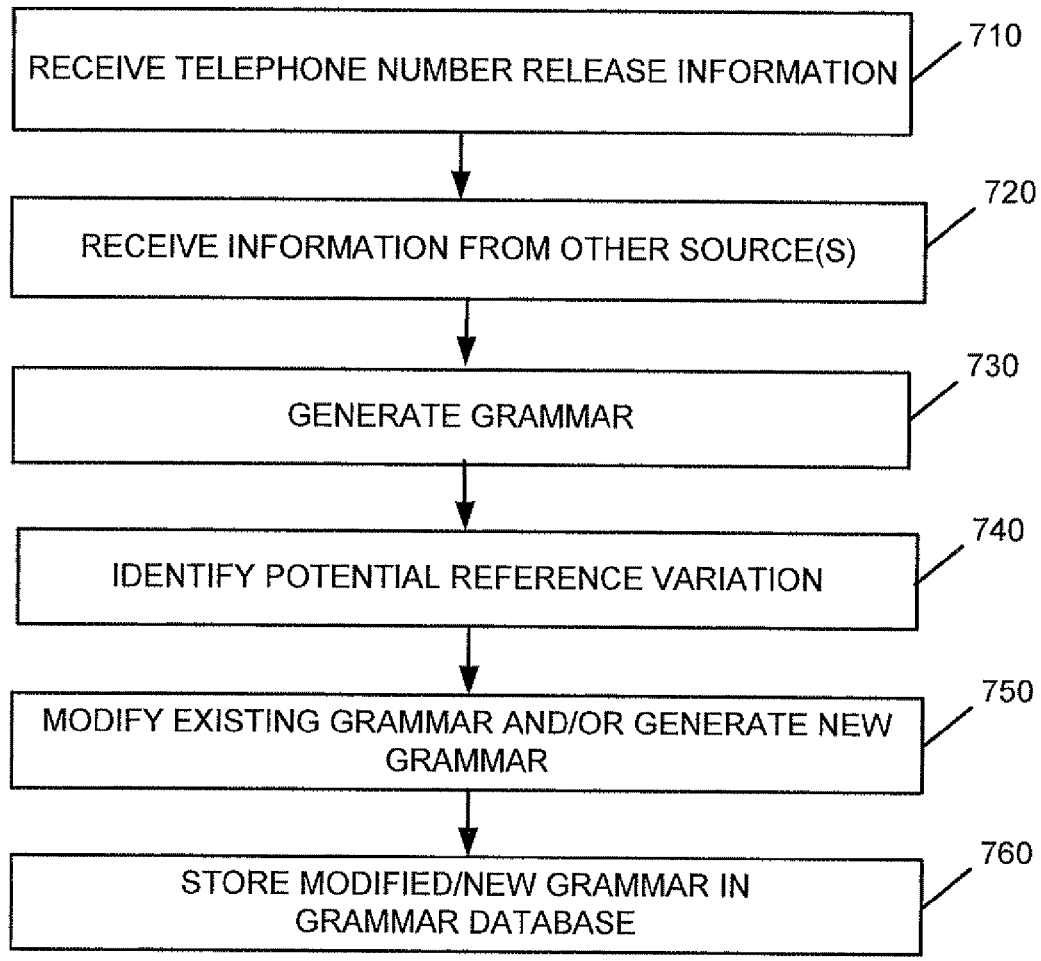

FIG. 7 illustrates exemplary processing associated with using information in telephone number release database 350 to generate reference variations. In some implementations, the processing performed by reference variation generator 340 may be an "off-line" process performed at any time and information generated by reference variation generator 340 may be provided to grammar database 320 at a later time, such as during a scheduled update of grammar database 320. In other implementations, processing performed by reference variation generator 340 may be performed in a real-time environment in which modifications to existing grammars or new grammars generated may be provided to grammar database 320 as they are generated. These grammars may then be used in a real-time manner to aid in speech recognition.

In either case, processing may begin by grammar generator 510 accessing or receiving information from telephone number release database 350 (act 710). In some implementations, grammar generator 510 may also receive data from other sources, such as DA database 330 and outside data source 530 (act 720).

Grammar generator 510 may then generate a grammar 512 associated with the retrieved information (act 730). For example, assume that grammar generator 510 is processing an input from telephone number release database 350 associated with the release of a telephone number for the listing "ACME Seafood Restaurant." Grammar generator 510 may identify reference variations for ACME Seafood Restaurant stored in DA database 330, such as that the word "restaurant" may be optional or that the word "seafood" may be optional. Grammar generator 510 may identify other variations for ACME Seafood Restaurant using, for example, information from outside data source 530. As described above, outside data source 530 may include information from a thesaurus, a dictionary and/or from the Internet (e.g., web searching, web mining, etc.). Grammar 512 may be associated with a particular telephone number released by call center 140 in response to a particular utterance. In this example, grammar 512 is associated with the telephone number for ACME Seafood Restaurant and the corresponding utterance made by a caller in utterance database 540.

Speech processing module 520 may receive grammar 512 and identify the audio file corresponding to the utterance from utterance database 540 and determine a reference variation associated with the listing for the released telephone number (act 740). For example, in the example above, suppose that the telephone number for AMCE Seafood Restaurant was released by call center 140 (and stored in telephone number release database 350) in response to a query for "ACME Fish House." In this case, speech processing module 520 may output reference variation 522 indicating that a reference variation or potential reference variation for "ACME Seafood Restaurant" is "ACME Fish House."

This potential reference variation 522 may be forwarded to grammar generator 510. Grammar generator 510 may then determine that a new reference variation for "ACME Seafood Restaurant" is "ACME Fish House." Grammar generator 510 may then determine that an existing grammar that includes a rule associated with identifying seafood restaurants should be modified to indicate that the term "fish house" may be used in place of "seafood restaurant" by callers. That is, grammar generator 510 may determine that since a caller for ACME Seafood Restaurant used the term "ACME Fish House," the term "fish house" is a reference variation for "seafood restaurant." Grammar generator 510 may then modify the existing grammar or create a new grammar based on reference variation 522 (act 750). In this example, grammar generator 510 may generate a grammar indicating that occurrence of the term "fish house" may be an attempt by a caller to identify a seafood restaurant.

In other cases, grammar generator 510 may not generalize reference variation 522 to any occurrence of the term "fish house." That is, grammar generator 510 may limit the new grammar's applicability to the listing for "ACME Seafood Restaurant" to indicate that when a caller voices "ACME Fish House," the caller may be attempting to identify "ACME Seafood Restaurant."

In each case, grammar generator 510 may store the new and/or modified grammar to grammar database 320 (act 760). The new/modified grammar may then be used to aid in speech recognition associated with future calls. For example, when a caller voices ACME Fish Market, speech processing module 310 may identify ACME Seafood Restaurant as the appropriate listing. In addition, in some implementations, when a caller voices Dave's Fish House, speech processing module 310 may identify Dave's Seafood Restaurant as the appropriate listing.

In this manner, information provided by call center 140 in response to a user request may be used to modify and/or create new reference variations and also to modify and/or create new grammars for identifying utterances from a caller.

In some implementations, potential reference variation 522 may not be considered for purposes of modifying an existing grammar or creating a new grammar until a number of repetitions of the same utterance occur. For example, after a single call voices "ACME Fish House" when the caller wishes to get the telephone number for ACME Seafood Restaurant, grammar generator 510 may store this occurrence along with a value indicating how many callers have voiced that utterance when attempting to identify ACME Seafood Restaurant. After a predetermined number of other callers voice "ACME Fish House" when attempting to find a telephone number for ACME Seafood Restaurant, grammar generator 510 may modify and/or provide a new grammar for grammar database 320 indicating that "ACME Fish House" is a reference variation for "ACME Seafood Restaurant" and/or more generally, that "fish house" is a reference variation for "seafood restaurant."

In still other implementations, speech processing module 520 may generate a potential reference variation 522 based on a confidence level associated with the utterance. For example, if speech processing module 520 does not have a high confidence level regarding what a caller voiced (stored in utterance database 540), speech processing module 520 may not generate a potential reference variation 522. In this case, if speech processing module 520 has a high enough confidence level (e.g., greater than 50%) with respect to what was voiced, speech processing module 520 may generate a potential reference variation 522. In addition, in some implementations, if the confidence level is not high enough, speech processing module 520 may wait until a number of additional callers provided the same utterance or the confidence level associated with what one or more of the additional callers voiced increases to indicate that speech processing module 520 has a relatively high confidence level of what was voiced by one or more callers prior to generating a potential reference variation 522.

CONCLUSION

Systems and methods described herein leverage information provided by an operator in response to a caller request to generate reference variations. These reference variations may then be used to aid in speech recognition.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, implementations described herein have been mainly described with respect to an operator at call center 140 releasing telephone numbers to callers and storing the released telephone numbers in telephone number release database 350. In other implementations, operators at call center 140 may provide other information to callers, such as a business name or some other identifier associated with a particular listing of interest. In this case, reference variation generator 340 may use this information provided to a caller by call center 140 to generate a potential reference variation and/or generate or modify a speech processing grammar.

In addition, implementations described herein have been described with respect to a speech recognition system used in a directory assistance system. In other implementations, the reference variations may be used for other purposes. For example, a business entity may decide that it should modify its business listing and/or name to reflect how callers actually identify the business. For example, if a majority of callers identify "ACME Seafood Restaurant" as "ACME Fish House," the owner of ACME Seafood Restaurant may change its business listing and/or name to "ACME Fish House."

Further, in other implementations, the caller request may not be associated with a directory assistance system. For example, a caller may be calling to request information regarding any topic of interest, such as attempting to find a price for a product offered by a store, attempting to find airline flight information, or any other item of interest. In each case, a reference variation generator may leverage information provided by an operator to generate a new reference variation and/or generate or modify a grammar for performing speech recognition.

Also, certain functions were described herein as being performed by various components and/or entities in network 100. It should be understood that any of these functions could be performed by other components and in some implementations, some or all of these functions could be performed by a single entity.

It will be apparent to one of ordinary skill in the art that aspects described herein may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit, a field programmable gate array, a processor, a microprocessor, software, or a combination of hardware and software.

In addition, while series of acts have been described with regard to FIGS. 6 and 7, the order of the acts may be modified in other implementations. Further, non-dependent acts may be performed in parallel.

No element, act, or instruction described herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system, comprising:
a logic device configured to:
receive a telephone number provided to a caller by an operator in response to voice input from the caller,
identify a listing associated with the telephone number,
generate a variation associated with at least a portion of the listing based on the voice input, the variation comprising an alternative way to identify at least the portion of the listing;
a memory configured to store a plurality of audio files corresponding to voice inputs provided by callers and which were forwarded to operators.

2. The system of claim 1, wherein the logic device is further configured to:
at least one of generate or modify a grammar associated with performing speech recognition based on the variation.

3. The system of claim 2, wherein the logic device is further configured to:
apply the variation to a portion of a plurality of listings.

4. The system of claim 1, wherein the logic device is further configured to:
access the memory to identify a first audio file corresponding to a first voice input,
perform speech recognition on the first audio file, and
generate the variation using output from the speech recognition.

5. The system of claim 1, wherein the logic device is further configured to:
determine a number of times a first voice input was received from callers, and
modify a grammar associated with performing speech recognition after the first voice input was received from callers a predetermined number of times.

6. A method, comprising:
receiving information provided to a caller in response to an utterance from the caller, the utterance being associated with identifying an item of interest; and
generating a reference variation associated with identifying the item of interest based on the utterance;
determining a number of times a given utterance was received from callers, and
modifying a grammar associated with performing speech recognition after the first voice input has been received from callers a predetermined number of times.

7. The method of claim 6, further comprising:
generating a rule associated with performing speech recognition based on the reference variation.

8. The method of claim 7, further comprising:
using the rule for identifying a plurality of items of interest.

9. A speech recognition system, comprising:
logic configured to:
receive information provided by a human operator to a caller in response to an utterance from a caller,
identify an item of interest associated with the information provided by the operator, and
generate a variation of at least one word associated with the item of interest based on the utterance;
store audio files corresponding to voice inputs provided by callers which have been forwarded to the human operator.

10. The speech recognition system of claim 9, wherein the logic is further configured to:
generate a grammar associated with performing speech recognition based on the variation.

11. The speech recognition system of claim 9, wherein the information provided by the human operator comprises a business name.

12. The speech recognition system of claim 9, wherein the logic device is further configured to:
identify a first audio file corresponding to a first voice input,
perform speech recognition on the first audio file, and
wherein, the variation is generate from the speech recognition.

13. The speech recognition system of claim 9, wherein the logic device is further configured to:
determine a number of times a given voice input has been received from callers, and
modify a grammar associated with performing speech recognition after the given voice input was received from callers a predetermined number of times.

14. A system, comprising:
a logic device configured to:
receive a telephone number provided to a caller by an operator in response to voice input from the caller,
identify a listing associated with the telephone number, and
generate a variation associated with at least a portion of the listing based on the voice input, the variation comprising an alternative way to at least the portion of the listing;
determine a number of times a given voice input was received from callers, and
modify a grammar used for performing speech recognition after the given voice input has been received from callers a predetermined number of times.

15. The system of claim 14, wherein the logic device is further configured to:
generate a grammar associated with performing speech recognition based on the variation.

16. The system of claim 14, wherein the logic device is further configured to:
modify a grammar associated with performing speech recognition based on the variation.

17. The system of claim 14, wherein the logic device is further configured to:
apply the variation to a portion of a plurality of listings.

18. The system of claim 14, wherein, the logic device further stores a plurality of audio files corresponding to voice inputs provided by callers and which have been forwarded to operators.

19. The system of claim 14, wherein the logic device is further configured to:

identify a first audio file corresponding to a first voice input, perform speech recognition on the first audio file, and generate the variation using output from the speech recognition.

20. The system of claim 14, wherein, the listing provided to the caller includes a business name.

\* \* \* \* \*